US012598146B2

(12) United States Patent
Bossemeyer et al.

(10) Patent No.: US 12,598,146 B2
(45) Date of Patent: Apr. 7, 2026

(54) SYSTEMS, METHODS, AND APPARATUSES FOR PREDICTING RESOURCE SHORTAGES USING MACHINE LEARNING

(71) Applicant: Premier Healthcare Solutions, Inc., Charlotte, NC (US)

(72) Inventors: Matthew Robert Bossemeyer, Charlotte, NC (US); Matthew Shimshock, Fairview, NC (US); Audrey Siepiela, Charlotte, NC (US); James Benjamin Davis, Chicago, IL (US); Michael Wynn Herron, Durham, NC (US)

(73) Assignee: PREMIER HEALTHCARE SOLUTIONS, INC., Charlotte, NC (US)

( * ) Notice: Subject to any disclaimer, the term of this patent is extended or adjusted under 35 U.S.C. 154(b) by 0 days.

(21) Appl. No.: 18/400,492

(22) Filed: Dec. 29, 2023

(65) Prior Publication Data

US 2024/0223512 A1    Jul. 4, 2024

Related U.S. Application Data

(60) Provisional application No. 63/435,856, filed on Dec. 29, 2022.

(51) Int. Cl.
*H04L 47/70* (2022.01)
(52) U.S. Cl.
CPC .......... *H04L 47/822* (2013.01); *H04L 47/821* (2013.01)
(58) Field of Classification Search
CPC ............................ H04L 47/822; H04L 47/821
(Continued)

(56) References Cited

U.S. PATENT DOCUMENTS

2007/0018601 A1* 1/2007 Steinbach ........... G06F 11/3447
                                                       318/568.11
2015/0187035 A1* 7/2015 Hogan ............. G06Q 10/06315
                                                       705/2
(Continued)

OTHER PUBLICATIONS

J. Breitenbach, S. Haileselassie, C. Schuerger, J. Werner and R. Buettner, "A Systematic Literature Review of Machine Learning Tools for Supporting Supply Chain Management in the Manufacturing Environment," 2021 IEEE International Conference on Big Data (Big Data), Orlando, FL, USA, 2021, p. 2875-2883 (Year: 2021).*

(Continued)

*Primary Examiner* — Taylor A Elfervig
(74) *Attorney, Agent, or Firm* — Moore & Van Allen PLLC

(57) ABSTRACT

Systems, methods, and apparatuses are described herein for predicting resource shortages using machine learning. The present invention is configured to identify a resource identifier(s) from a resource database; receive a resource transaction dataset associated with the resource identifier(s); identify a key performance indicator(s) from the resource transaction dataset; generate a key performance signal(s), wherein the key performance signal(s) comprises a plurality of values of the key performance indicator(s) over a predetermined period; apply the key performance signal(s) to a supply shortage labeling operation; identify a resource shortage event(s) associated with the resource identifier(s); apply the key performance signal(s) and the resource shortage event(s) to train a supply shortage machine learning model; and generate, by the supply shortage machine learning model, a likelihood of a future-shortage for the resource identifier(s) which is based on the at least one key performance signal for at least one point in time.

20 Claims, 11 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2016/0314432 A1* | 10/2016 | Bhatti | .................. | G06F 16/951 |
| 2020/0379803 A1* | 12/2020 | Saillet | .................. | G06F 9/4887 |
| 2021/0166819 A1* | 6/2021 | Gupta | .................... | G16H 50/30 |
| 2021/0365876 A1* | 11/2021 | Breese | .................... | G07F 9/026 |
| 2023/0297948 A1* | 9/2023 | Borjian | ............... | G06Q 10/087 |
| | | | | 705/28 |

OTHER PUBLICATIONS

J. P. Devarajan, A. Manimuthu and V. R. Sreedharan, "Healthcare Operations and Black Swan Event for Covid-19 Pandemic: A Predictive Analytics," in IEEE Transactions on Engineering Management, vol. 70, No. 9, pp. 3229-3243, Jun. 2, 2021 (Year: 2021).*

\* cited by examiner

100

140

140

130

140

NETWORK 110

140

140

140

300

IDENTIFY AT LEAST ONE RESOURCE IDENTIFIER FROM A RESOURCE DATABASE
302

RECEIVE A RESOURCE TRANSACTION DATASET ASSOCIATED WITH THE AT LEAST ONE RESOURCE IDENTIFIER
304

IDENTIFY AT LEAST ONE KEY PERFORMANCE INDICATOR FROM THE RESOURCE TRANSACTION DATASET
306

GENERATE, BASED ON THE AT LEAST ONE KEY PERFORMANCE INDICATOR, AT LEAST ONE KEY PERFORMANCE SIGNAL, WHEREIN THE AT LEAST ONE KEY PERFORMANCE SIGNAL COMPRISES A PLURALITY OF VALUES OF THE AT LEAST ONE KEY PERFORMANCE INDICATOR OVER A PREDETERMINED PERIOD
308

APPLY THE AT LEAST ONE KEY PERFORMANCE SIGNAL TO A SUPPLY SHORTAGE LABELING OPERATION
310

IDENTIFY, BY THE SUPPLY SHORTAGE LABELING OPERATION, AT LEAST ONE RESOURCE SHORTAGE EVENT ASSOCIATED WITH THE AT LEAST ONE RESOURCE IDENTIFIER
312

APPLY THE AT LEAST ONE KEY PERFORMANCE SIGNAL AND THE AT LEAST ONE RESOURCE SHORTAGE EVENT TO TRAIN A SUPPLY SHORTAGE MACHINE LEARNING MODEL
314

GENERATE, BY THE SUPPLY SHORTAGE MACHINE LEARNING MODEL, A LIKELIHOOD OF A FUTURE-SHORTAGE FOR THE RESOURCE IDENTIFIER, WHERIEN THE LIKELIHOOD OF A FUTURE-SHORTAGE FOR THE RESOURCE IDENTIFIER IS BASED ON THE AT LEAST ONE KEY PERFORMANCE SIGNAL FOR AT LEAST ONE POINT IN TIME
316

DETERMINE A LIKELIHOOD OF FUTURE-SHORTAGE FOR EACH RESOURCE IDENTIFIER OF A PLURALITY OF RESOURCE IDENTIFIERS ASSOCIATED WITH A RESOURCE DATABASE
318

FIG. 3

IDENTIFY, BY THE SUPPLY SHORTAGE LABELING OPERATION, AT LEAST ONE VARIATION OF THE AT LEAST ONE KEY PERFORMANCE SIGNAL
402

IDENTIFY, BASED ON THE AT LEAST ONE VARIATION OF THE AT LEAST ONE KEY PERFORMANCE SIGNAL, THE AT LEAST ONE RESOURCE SHORTAGE EVENT
404

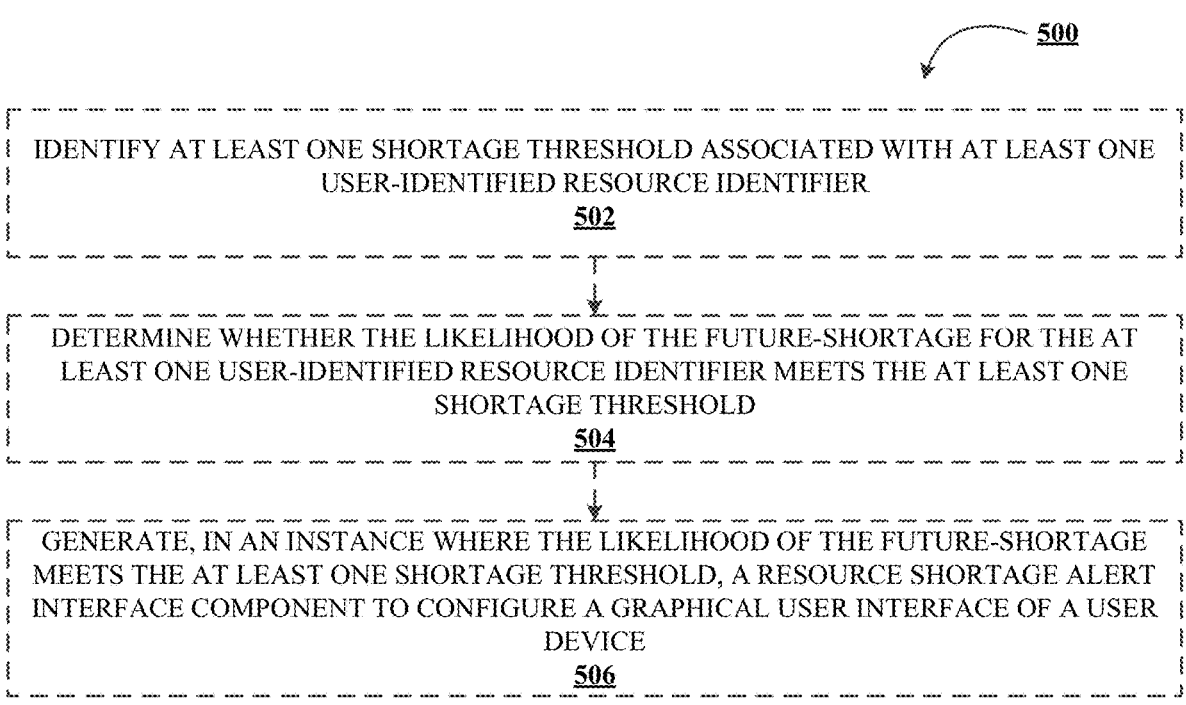

IDENTIFY AT LEAST ONE SHORTAGE THRESHOLD ASSOCIATED WITH AT LEAST ONE USER-IDENTIFIED RESOURCE IDENTIFIER
502

DETERMINE WHETHER THE LIKELIHOOD OF THE FUTURE-SHORTAGE FOR THE AT LEAST ONE USER-IDENTIFIED RESOURCE IDENTIFIER MEETS THE AT LEAST ONE SHORTAGE THRESHOLD
504

GENERATE, IN AN INSTANCE WHERE THE LIKELIHOOD OF THE FUTURE-SHORTAGE MEETS THE AT LEAST ONE SHORTAGE THRESHOLD, A RESOURCE SHORTAGE ALERT INTERFACE COMPONENT TO CONFIGURE A GRAPHICAL USER INTERFACE OF A USER DEVICE
506

FIG. 5

RESOURCE SHORTAGE SCORE

Shortage Score by Product & Week

| Manufacturer Name | Manufacturer Part Number | 9/11/22 | 9/18/22 | 9/25/22 | 10/2/22 | 10/9/22 | 10/16/22 | 10/23/22 |
|---|---|---|---|---|---|---|---|---|
| SOURCE A | 2090 | | | | | | | |
| SOURCE B | 059037 | | | | | | | |
| SOURCE C | PXW35 | | | | | | | |
| | PXW35 | | | | | | | |

| What you're currently buying. | | | | | | Substitute options | | | |
|---|---|---|---|---|---|---|---|---|---|
| Criticality Level | Manufacturer Name | Manufacturer Item Number | Average Daily Usage | Probability of National Shortage in 3-6 Weeks | Sub Product Description | Sub Product Mfr Top Parent Name | Sub Product Catalog Number | Average Daily Usage (for Sub Product) | Probability of National Shortage in 3-6 Weeks (for Sub Product) |
| 1 | SOURCE A | PRW35 | 75 | 86.9% | STAPLER SKIN MULTIFIRE PREMIUM | SOURCE C | 59037 | 48 | 3.5% |
| 1 | SOURCE B | PMW35 | 64 | 77.1% | STAPLER SKIN REFLEX ONE RETRACT | SOURCE D | 8535 | 16 | 64.1% |

SYSTEMS, METHODS, AND APPARATUSES FOR PREDICTING RESOURCE SHORTAGES USING MACHINE LEARNING

CROSS-REFERENCE TO RELATED APPLICATION

This application claims the benefit of U.S. Provisional Patent Application Ser. No. 63/435,856, filed Dec. 29, 2022, entitled "SYSTEMS, METHODS, AND APPARATUSES FOR PREDICTING RESOURCE SHORTAGES USING MACHINE LEARNING", the entirety of which is incorporated herein by reference.

FIELD OF INVENTION

The present invention discloses a system for predicting resource shortages using a supply shortage labeling operation and machine learning.

BACKGROUND

Recipients of products and resources that are critical to their day-to-day operations may have a harder time than ever predicting when a resource or product shortage may occur. Thus, there exists a need for a system that can accurately, efficiently, and dynamically determine future, potential resource shortages.

Applicant has identified several deficiencies and problems associated with predicting resource shortages based on electronic data. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for predicting resource shortages using machine learning is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: identify at least one resource identifier from a resource database; receive a resource transaction dataset associated with the at least one resource identifier; identify at least one key performance indicator from the resource transaction dataset; generate, based on the at least one key performance indicator, at least one key performance signal, wherein the at least one key performance signal comprises a plurality of values of the at least one key performance indicator over a predetermined period; apply the at least one key performance signal to a supply shortage labeling operation; identify, by the supply shortage labeling operation, at least one resource shortage event associated with the at least one resource identifier; apply the at least one key performance signal and the at least one resource shortage event to train a supply shortage machine learning model; and generate, by the supply shortage machine learning model, a likelihood of a future-shortage for the resource identifier, wherein the likelihood of a future-shortage for the resource identifier is based on the at least one key performance signal for at least one point in time.

In some embodiments, the at least one processing device is further configured to: identify, by the supply shortage labeling operation, at least one variation of the at least one key performance signal; and identify, based on the at least one variation of the at least one key performance signal, the at least one resource shortage event. In some embodiments, the at least one resource shortage event is identified based on an identification of at least two variations within a rolling window of at least two time periods on the at least one key performance signal or based on at least one label augmentation identifier.

In some embodiments, the at least one processing device is further configured to determine a likelihood of future-shortage for each resource identifier of a plurality of resource identifiers associated with a resource database.

In some embodiments, the at least one processing device is further configured to: identify at least one shortage threshold associated with at least one user-identified resource identifier; determine whether the likelihood of the future-shortage for the at least one user-identifier resource identifier meets the at least one shortage threshold; and generate, in an instance where the likelihood of the future-shortage meets the at least one shortage threshold, a resource shortage alert interface component to configure a graphical user interface of a user device.

In some embodiments, the resource transaction dataset comprises at least one of a plurality of resource transactions from a plurality of resource recipients and across a plurality of geolocations, or a supplementary resource dataset.

In some embodiments, the least one key performance indicator comprises at least one of at least one general key performance indicator or at least one specific key performance indicator.

In some embodiments, the at least one key performance indicator comprises at least one of an average daily usage of each resource, a volume of inventory on hand of each resource, a volume of order receipts of each resource, an average historical lead time of each resource, an average days past due of each resource, a volume of open orders of each resource, a volume of past-due orders of each resource, a percentage of open purchase order (PO) lines that are past-due of each resource, a total of PO lines with cancellation activity of each resource, a volume of new orders of each resource, a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitutions of each resource, a volume of resource substitutions of each resource, or a forward-looking estimated lead time of each resource.

In some embodiments, the resource transaction dataset is based on at least one resource recipient system.

In some embodiments, the predetermined period comprises at least one of a plurality of consecutive durations or a plurality of non-consecutive durations.

In some embodiments, the likelihood of future-shortage comprises a shortage prediction over a future period, and wherein the future period comprises at least one of a future one week, a future two weeks, a future three weeks, a future four weeks, a future five weeks, a future six weeks, a future seven weeks, a future eight weeks, a future nine weeks, a future ten weeks, a future eleven weeks, a future twelve weeks, or a plurality of consecutive future weeks.

In another aspect, a computer program product for predicting resource shortages using machine learning is provided. In some embodiments, the computer program product may comprise at least one non-transitory computer-readable medium having computer-readable program code portions embodied therein, the computer-readable program code portions which when executed by a processing device are configured to cause the processor to: identify at least one resource identifier from a resource database; receive a resource transaction dataset associated with the at least one resource identifier; identify at least one key performance indicator from the resource transaction dataset; generate, based on the at least one key performance indicator, at least one key performance signal, wherein the at least one key performance signal comprises a plurality of values of the at least one key performance indicator over a predetermined period; apply the at least one key performance signal to a supply shortage labeling operation; identify, by the supply shortage labeling operation, at least one resource shortage event associated with the at least one resource identifier; apply the at least one key performance signal and the at least one resource shortage event to train a supply shortage machine learning model; and generate, by the supply shortage machine learning model, a likelihood of a future-shortage for the resource identifier, wherein the likelihood of a future-shortage for the resource identifier is based on the at least one key performance signal for at least one point in time.

In some embodiments, the at least one processing device is further configured to determine a likelihood of future-shortage for each resource identifier of a plurality of resource identifiers associated with a resource database.

In some embodiments, the resource transaction dataset comprises at least one of a plurality of resource transactions from a plurality of resource recipients and across a plurality of geolocations, or a supplementary resource dataset.

In some embodiments, the at least one key performance indicator comprises at least one of an average daily usage of each resource, a volume of inventory on hand of each resource, a volume of order receipts of each resource, an average historical lead time of each resource, an average days past due of each resource, a volume of open orders of each resource, a volume of past-due orders of each resource, a percentage of open purchase order (PO) lines that are past-due of each resource, a total of PO lines with cancellation activity of each resource, a volume of new orders of each resource, a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitutions of each resource, a volume of resource substitutions of each resource, or a forward-looking estimated lead time of each resource.

In some embodiments, the predetermined period comprises at least one of a plurality of consecutive durations or a plurality of non-consecutive durations.

In another aspect, a computer implemented method for predicting resource shortages using machine learning is provided. In some embodiments, the computer implemented method comprises: identifying at least one resource identifier from a resource database; receiving a resource transaction dataset associated with the at least one resource identifier; identifying at least one key performance indicator from the resource transaction dataset; generating, based on the at least one key performance indicator, at least one key performance signal, wherein the at least one key performance signal comprises a plurality of values of the at least one key performance indicator over a predetermined period; applying the at least one key performance signal to a supply shortage labeling operation; identifying, by the supply shortage labeling operation, at least one resource shortage event associated with the at least one resource identifier; applying the at least one key performance signal and the at least one resource shortage event to train a supply shortage machine learning model; and generating, by the supply shortage machine learning model, a likelihood of a future-shortage for the resource identifier, wherein the likelihood of a future-shortage for the resource identifier is based on the at least one key performance signal for at least one point in time.

In some embodiments, the computer implemented method further comprises determining a likelihood of future-shortage for each resource identifier of a plurality of resource identifiers associated with a resource database.

In some embodiments, the at least one key performance indicator comprises at least one of an average daily usage of each resource, a volume of inventory on hand of each resource, a volume of order receipts of each resource, an average historical lead time of each resource, an average days past due of each resource, a volume of open orders of each resource, a volume of past-due orders of each resource, a percentage of open purchase order (PO) lines that are past-due of each resource, a total of PO lines with cancellation activity of each resource, a volume of new orders of each resource, a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitutions of each resource, a volume of resource substitutions of each resource, or a forward-looking estimated lead time of each resource.

In some embodiments, the predetermined period comprises at least one of a plurality of consecutive durations or a plurality of non-consecutive durations.

As will be understood by one of ordinary skill in the art, the above-recited features may also be implemented at least by a computer-implemented method, a computer-program product, and/or the like.

BRIEF DESCRIPTION OF THE DRAWINGS

Figure 1A:
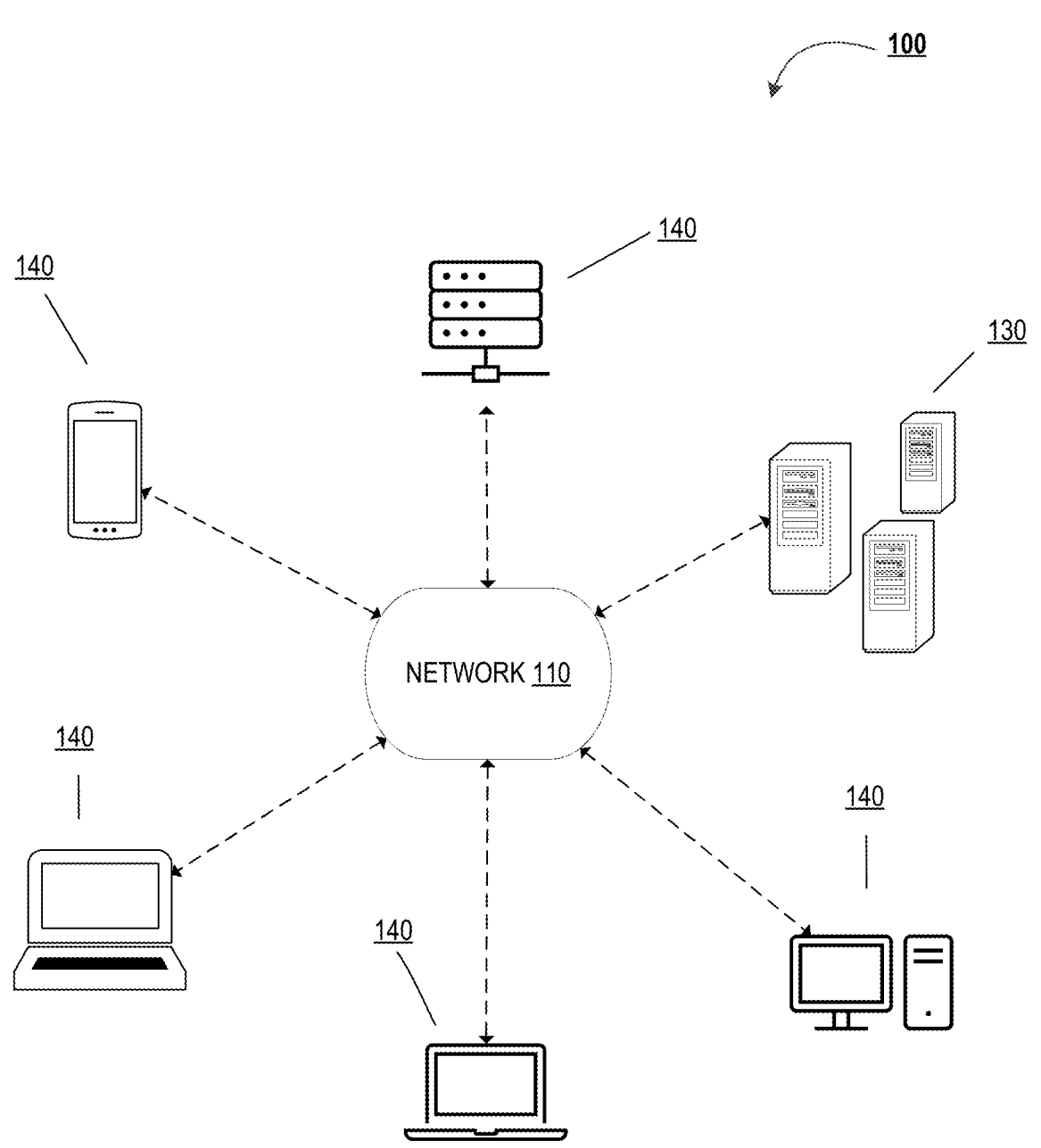
Figure 1B:
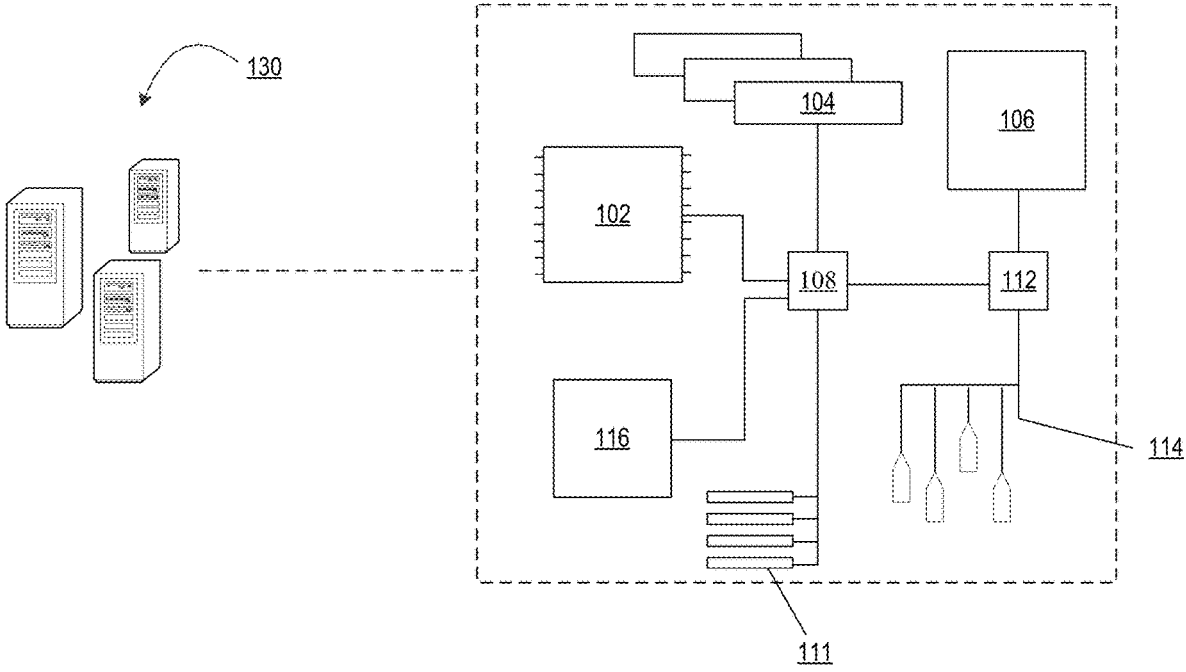
Figure 1C:
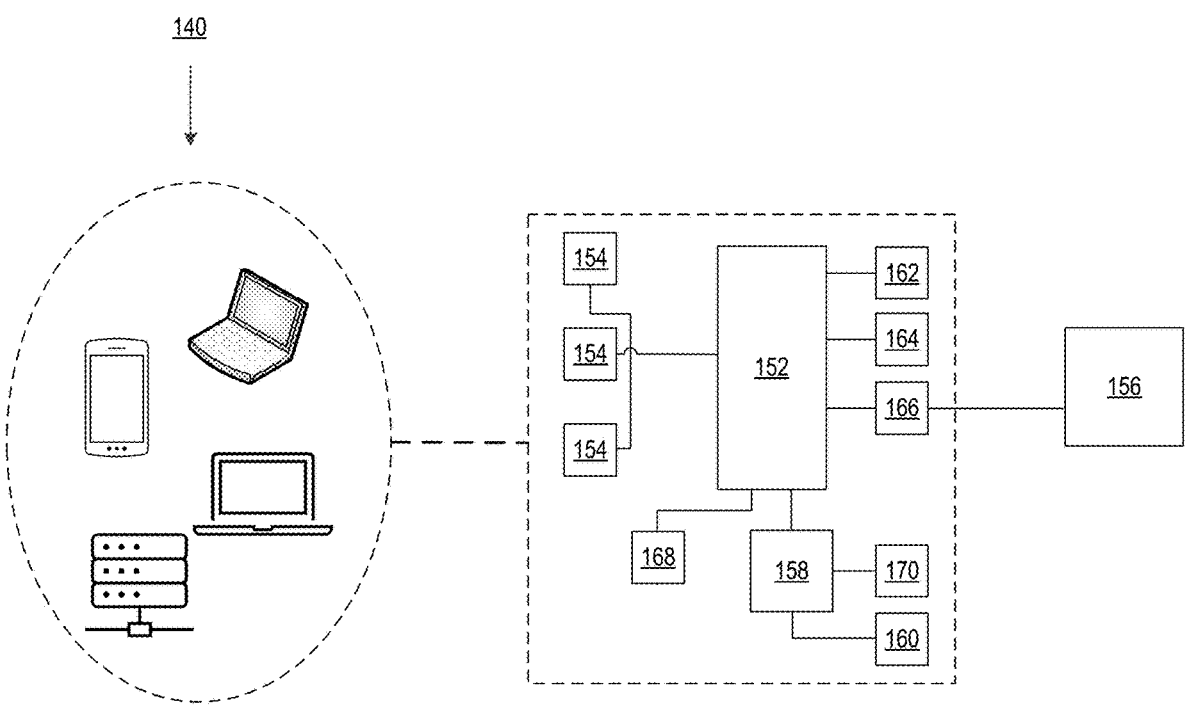
Figure 2:
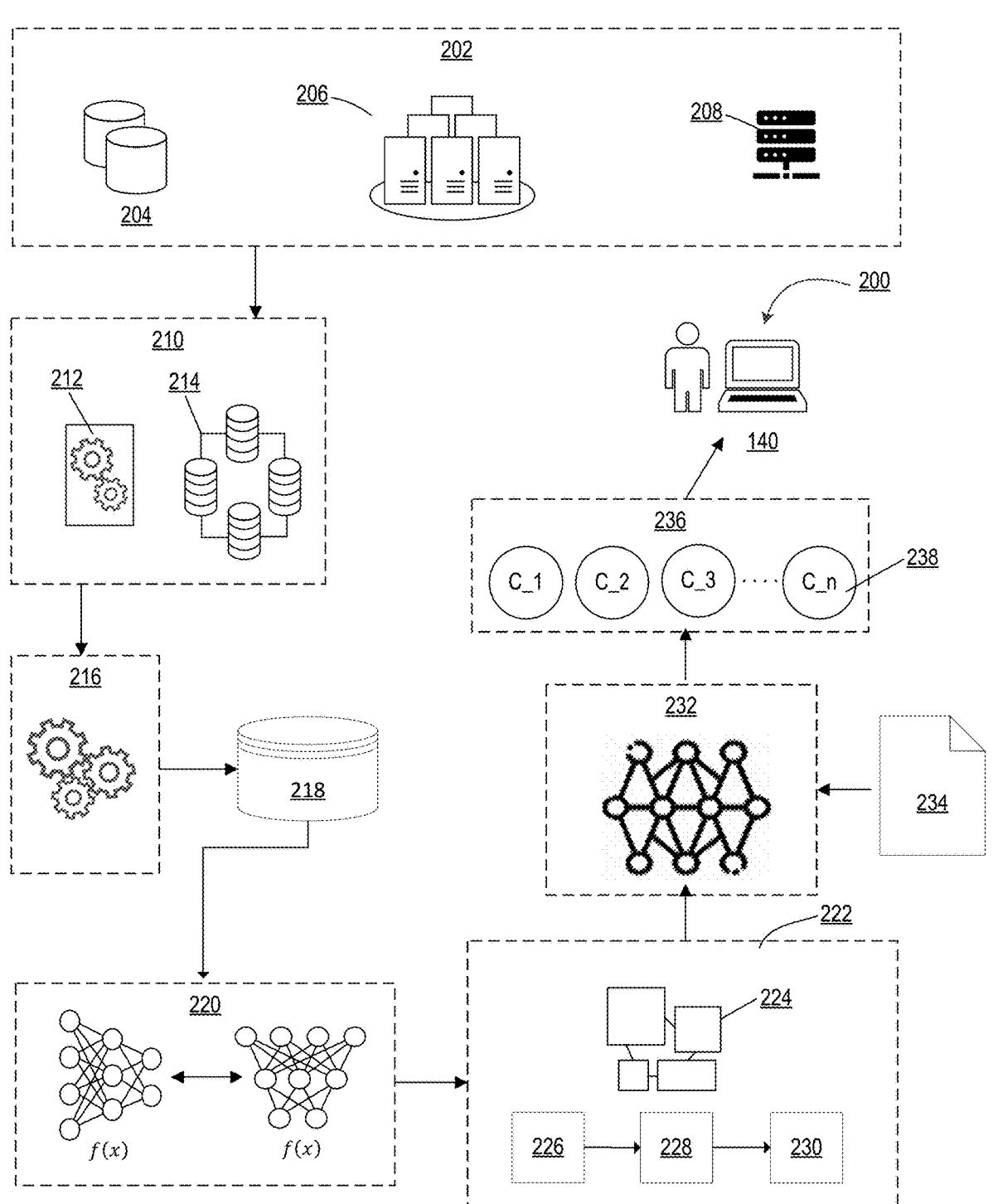

Having thus described embodiments of the invention in general terms, reference will now be made to the accompanying drawings, wherein:

FIGS. 1A-1C illustrates technical components of an exemplary distributed computing environment for predicting resource shortages using machine learning, in accordance with an embodiment of the disclosure;

FIG. 2 illustrates an exemplary machine learning (ML) or artificial intelligence (AI) subsystem architecture 200, in accordance with an embodiment of the disclosure;

5

Figure 4:
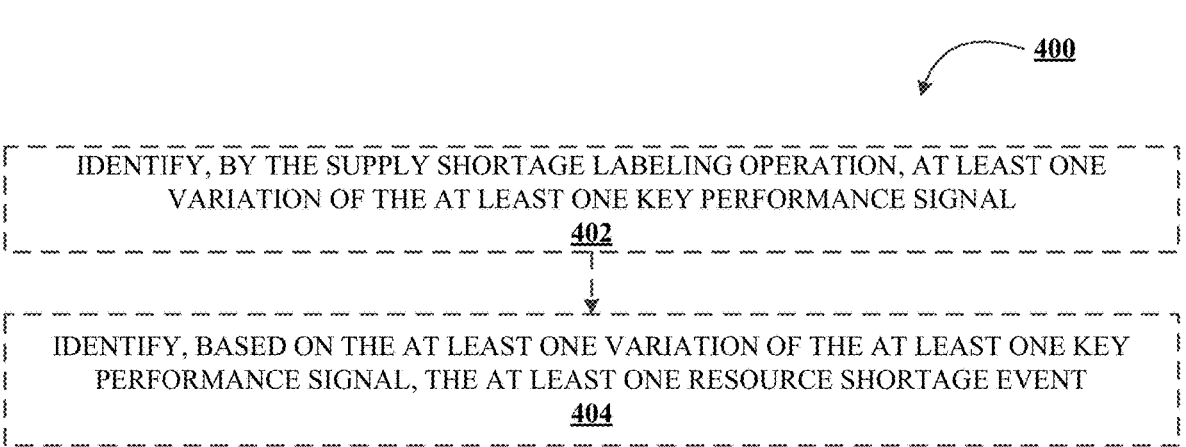
Figures 7A, 7B:
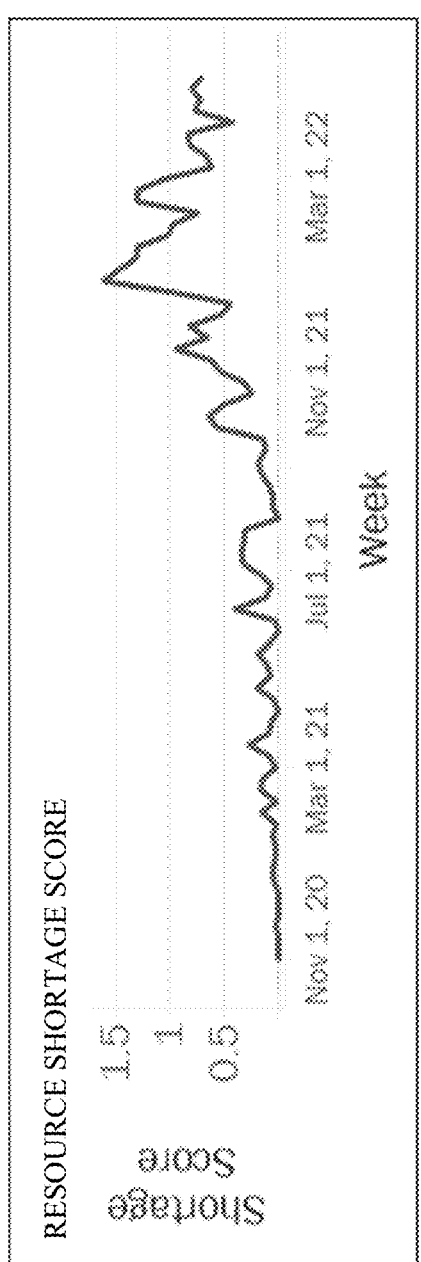
Figure 8:
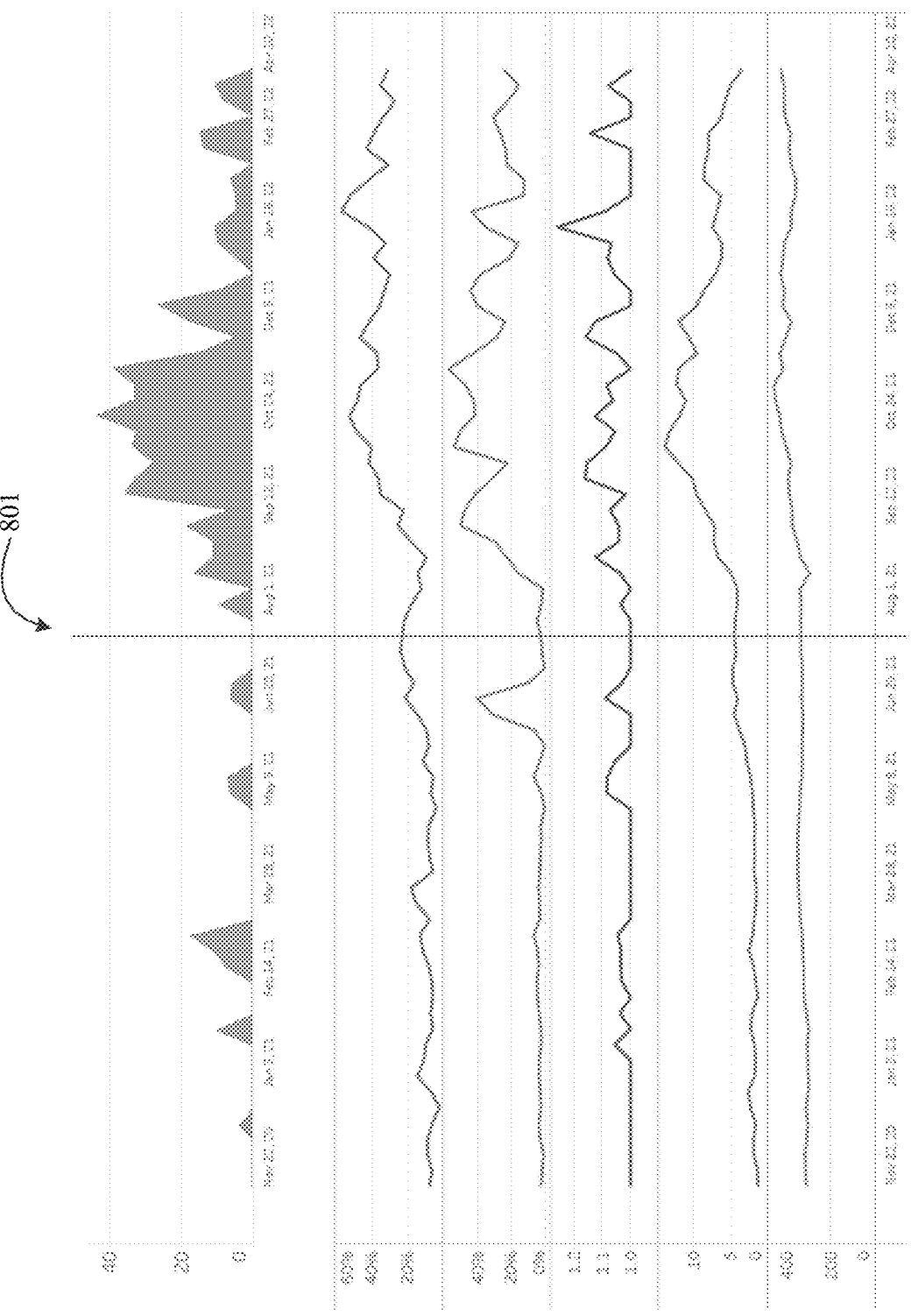

FIG. 3 illustrates an exemplary process flow for predicting resource shortages using machine learning, in accordance with an embodiment of the disclosure;

FIG. 4 illustrates an exemplary process flow for identifying shortage event(s), in accordance with an embodiment of the disclosure;

FIG. 5 illustrates an exemplary process flow for generating a shortage alert interface component and configuring a graphical user interface (GUI) of the user device based on the shortage alert interface component, in accordance with an embodiment of the disclosure;

FIGS. 6A-6D illustrates exemplary graphs and signals of key performance indicators, in accordance with an embodiment of the disclosure;

FIG. 7A illustrates an exemplary graph of a shortage score for a resource over a predetermined period and over a future period, in accordance with an embodiment of the disclosure;

7B illustrates an exemplary table of shortage scores based on source entities and over different time periods, in accordance with an embodiment of the disclosure;

FIG. 8 illustrates an exemplary table of key performance signals (which may be general or specific) over a predetermined period and a future period, in accordance with an embodiment of the disclosure; and FIG. 9 illustrates an exemplary table of resource identifiers, sources for each resource, likelihoods of a future-shortage for the resource identifier, associated substitute resources, and other such data, in accordance with an embodiment of the disclosure.

DETAILED DESCRIPTION OF EMBODIMENTS OF THE INVENTION

Embodiments of the present invention will now be described more fully hereinafter, with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

FIGS. 1A-1C illustrate technical components of an exemplary distributed computing environment for predicting resource shortages using machine learning 100, in accordance with an embodiment of the invention. As shown in FIG. 1A, the distributed computing environment 100 contemplated herein may include a system 130, a client device(s) 140, and a network 110 over which the system 130 and client device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the client device(s) 140 may have a client-server relationship in which the client device(s) 140 are remote devices that request and receive service from a centralized server, i.e., the system 130. In some other embodiments, the system 130 and the client device(s) 140 may have a peer-to-peer relationship in which the system 140 and the client device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The client device(s) 140 may represent various forms of electronic devices, including user input devices such as personal digital assistants, cellular telephones, smartphones, laptops, desktops, and other similar computing devices.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all the portions of the distributed computing environment 100 may be combined into a single portion or all the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130)

and capable of being configured to execute specialized processes as part of the larger system.

The processor 102 can process instructions, such as instructions of an application that may perform the functions disclosed herein. These instructions may be stored in the memory 104 or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. In some embodiments, the system 130 may use cloud-based servers to store, process/analyze, and generate the results described herein. Such cloud-based servers and other such cloud-based computing resources may be used in conjunction with the machine learning model(s) shown and described below with respect to FIG. 2, such that the cloud-based computing resources are configured to store data as well as train the machine learning model(s) for complex and robust data.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations, a cloud-based storage device(s), and/or the like. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the client device(s) 140, in accordance with an embodiment of the invention. As shown in FIG. 1C, the client device(s) 140 includes a processor 152, memory 154, an input/output device such as a display 156, a communication interface 158, and a transceiver 160, among other components. The client device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the client device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the client device(s) 140, such as control of user interfaces, applications run by client device(s) 140, and wireless communication by client device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 166 may comprise appropriate circuitry and configured for driving the display 156 to present graphical and other information to a user. The control interface 164 may receive commands from a user and convert them for submission to the processor 152. In some embodiments, the display interface 166 may be configured to show a database table based on a cloud-based computing environment, which may be connected to an entity intelligence server (e.g., a business intelligence server and/or a web application) to display the end results of the process described herein to the user via the display interface 166. Additionally, and in some embodiments, a plurality of display interfaces 166 associated with a plurality of displays 156 may distribute the results (e.g., in a database table format) to a plurality of end-users automatically. Such distributed results may comprise a selectable link, such as files attached to electronic messages within the distributed results. In addition, an external interface 168 may be provided in communication with processor 152, so as to enable near area communication of client device(s) 140 with other devices. External interface 168 may provide, for example, for wired communication in some implementations, or for wireless communication in other implementations, and multiple interfaces may also be used.

The memory 154 stores information within the client device(s) 140. The memory 154 can be implemented as one or more of a computer-readable medium or media, a volatile memory unit or units, or a non-volatile memory unit or units. Expansion memory may also be provided and connected to client device(s) 140 through an expansion interface (not shown), which may include, for example, a SIMM (Single In Line Memory Module) card interface. Such expansion memory may provide extra storage space for client device(s) 140 or may also store applications or other information therein. In some embodiments, expansion memory may include instructions to carry out or supplement the processes described above and may include secure information also. For example, expansion memory may be provided as a security module for client device(s) 140 and may be programmed with instructions that permit secure use of client device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the client device(s) 140 to transmit and/or receive information or commands to and from the system 130 via the network 110. Any communication between the system 130 and the client device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the client device(s) 140 may provide the system 130 (or other client devices) permissioned access to the protected resources of the client device(s) 140, which may include a GPS device, an image capturing component (e.g., camera), a microphone, and/or a speaker.

The client device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to client device(s) 140, which may be used as appropriate by applications running thereon, and in some embodiments, one or more applications operating on the system 130.

The client device(s) 140 may also communicate audibly using audio codec 162, which may receive spoken information from a user and convert it to usable digital information. Audio codec 162 may likewise generate audible sound for a user, such as through a speaker, e.g., in a handset of client device(s) 140. Such sound may include sound from voice telephone calls, may include recorded sound (e.g., voice messages, music files, etc.) and may also include sound generated by one or more applications operating on the client device(s) 140, and in some embodiments, one or more applications operating on the system 130.

Various implementations of the distributed computing environment 100, including the system 130 and client device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an exemplary process flow 300 for predicting resource shortages using machine learning, in accordance with an embodiment of the disclosure. For instance, the present invention provides a system comprising a combination of algorithmic and machine-learning based approaches, which are described in further detail herein, the output of which may comprise a classification of whether a specific resource is in state of shortage at a specific point in time as well as the probability that the resource will be in a state of shortage at some point within a specific future window of time. In some embodiments, a system (e.g., similar to one or more of the systems described herein with respect to FIGS. 1A-1C FIG. 2) may perform one or more of the steps of process flow 300.

The present disclosure has identified various problems that the present disclosure hopes to solve and does solve, which is discussed in further detail below. In addition to the problems discussed above, the present disclosure solves issues that may arise with respect to shortages in medical supplies. For instance, shortages of medical supplies negatively impact the safety of healthcare provider staff and the health outcomes of patients. A system that could accurately predict shortages would enable healthcare providers and their suppliers to mitigate this impact. This in turn would lead to improved worker safety, healthier patients, and a more efficient healthcare supply chain.

At present there are no accurate, efficient, dynamic predictors for current and/or future supply shortages. Thus, organizations have had to rely on simple, lagging indicators to determine where to focus their attention. Hospitals were consumed with reacting to already-present shortages. They focused on addressing orders that were recently cancelled or placed on backorder, but often failed to see early warning signs in their own data or in the experience of their peers. Suppliers would monitor their ability to fill orders, but were also blind to significant risk factors adjacent to them in the supply chain. For example, a major shortage may begin with just one or two suppliers struggling for weeks to meet demand. These suppliers may hesitate to communicate about the issue, fearing that this may draw negative attention, invite competition, and even possibly scare clients away. However, when the situation worsens and customers suddenly start to shift their demand to other suppliers, it often takes these suppliers by surprise and causes even more shortages. Recently impacted suppliers may overestimate how their demand will increase, placing unnecessary demands on shared and on potentially already constrained resources, such as raw material or shipping, which in turn exacerbates the situation for all.

Signals in the purchasing, receiving, inventory, and consumption data of the consumers of medical supplies reliably point to future disruption in supply. For example, a rapid increase in the rate of consumption of a particular supply coupled with an increase in past-due orders across multiple distributors strongly suggest that a shortage is imminent. Persistent shortages with one supplier combined with increased product substitution rates and/or increasing competitor lead times suggest that shortages are likely to spread. Modern methods of machine-learning create the potential for system, trained on a sufficiently large, up-to-date, and carefully prepared dataset, to detect very subtle indications across a wide array of signals that specific types of future events are imminent. When precisely configured, these systems can reliably identify the specific medical supplies that are most likely to experience shortages within a predefined future window of time, enabling suppliers and providers to address potential shortages before they cause harm. Thus, the present disclosure solves the above-identified electronic and data-driven problems by following some and/or all the procedures outlined below and in combination with the technology herein identified.

As shown in block 302, the process flow 300 may include the step of identifying at least one resource identifier from a resource database. For example, the system may identify at least one resource identifier associated with a resource, where the resource as used herein may refer to a product that is manufactured or generated for a particular purpose. In some embodiments, the resource may refer to a medical device or product (e.g., such as a product manufactured for a hospital or other such medical facility). By way of non-limiting example, the system may identify a particular resource for which a shortage prediction should be made, such as a particular medical device that is often used in the healthcare industry. In some embodiments, the resource may comprise devices and/or products manufactured for other industries beyond the medical or healthcare industry.

In some embodiments, the system may identify at least one resource identifier from a resource database, where the resource database may comprise all the resource identifiers for each of the resources that the system tracks. In some embodiments, the resource identifier identified by the system may be identified based on a particular client of the system (e.g., a particular medical organization, such as a hospital, doctor's office, clinic, and/or the like) that is known to have used the resource associated with the resource identifier in the past. Thus, and in some embodiments, the system may identify each of the resources associated with a particular client (e.g., each of the resources used by a particular client), the associated resource identifiers for each of the resources from the resource database, and perform the processes described herein.

In some embodiments, the system may identify at least one resource identifier from a resource database by reviewing each of the resource identifiers within the entire resource database, whereby each resource identifier is considered by the system continuously and at specific times, such as on a daily basis, a weekly basis, a monthly basis, a yearly basis, and/or the like.

In some embodiments, a plurality of resource identifiers may be identified from the resource database. Such a plurality of resource identifiers may be based on the system receiving a user-selection of the resource identifiers which the user or entity views as the most important for their purpose (e.g., carrying out their day-to-day business and tasks).

As shown in block 304, the process flow 300 may include the step of receiving a resource transaction dataset associated with the at least one resource identifier. In some embodiments, the system may receive a resource transaction dataset associated with the at least one resource identifier, where the resource transaction dataset may comprise all (or a subset) of the resource transaction data associated with the resource identifier(s). For instance, the resource transaction dataset may comprise data of each resource transaction such as data regarding the source name(s) of the resource (e.g., the manufacturer and/or seller's name), the resource source's identifier (e.g., the manufacturer and/or seller's identifier for the resource, such as an item number or item name), a critical level (which is discussed in further detail below), an average daily usage of the resource (e.g., nationally or at a specific recipient location), a number of units ordered, a number of substitutions (e.g. substitution of an equal or similar resource), the time between when the resource was ordered and resource transaction was completed, time past due of the resource transaction being completed (e.g., time and/or days past due for which the resource has not been delivered, but was promised), and/or the like.

In some embodiments, the plurality of resource transactions for the resource transaction dataset may comprise resource transactions from across a plurality of geolocations (e.g., across a plurality of cities, across a plurality of states, such that resource transactions are considered on a national level, and/or the like).

In some embodiments, the resource transactions for the resource transaction dataset may comprise a plurality of resource transactions from a plurality of recipients and/or purchasers of the resource(s). Further, and in some embodiments, the system may also track all the resource transactions for a particular resource type over a plurality of sources or manufacturers (e.g., such as a particular type of resource which may be aggregated across different sources such as latex-free examination gloves which many sources may produce, manufacture, ship, and/or the like). In this manner, the system may keep track of all the resource transactions occurring for a particular resource type over a broad range (e.g., over a plurality of recipients, over a plurality of sources, over a plurality of geolocations, over a predetermined period, and/or the like).

In some embodiments, the system may receive resource transaction data to generate the resource transaction dataset from a recipient entity's database of resource transactions. In other words, and in some embodiments, the resource transaction dataset may be based on at least one resource recipient system. For instance, such a resource recipient system may refer to a warehouse management system, enterprise planning system, enterprise resource planning system, warehouse management application, enterprise planning application, or enterprise resource planning application, which may comprise a database, system, application, and/or the like, comprising data regarding an entity's policies, requirements, future plans, current inventories of resources, human resources, staff, current patients, and/or the like. Thus, and in some embodiments, the resource transaction dataset may comprise data regarding an entity's current and historical usage or resources, associated resource identifiers, future planning/future orders, current orders of resources, unfulfilled and fulfilled orders of resources, and/or the like.

For instance, and where the recipient is a healthcare organization such as a hospital, the hospital may comprise at least one enterprise resource planning system (ERP system) which tracks each of the resources used and/or purchased by the recipient, an average daily usage of the resource (e.g., nationally or at a specific recipient location), a number of units ordered, a number of substitutions (e.g. substitution of an equal or similar resource), the time between when the resource was ordered and when resource transaction was completed, time past due of the resource transaction being completed (e.g., time and/or days past due for which the resource has not been delivered, but was promised), and/or the like. Thus, and by receiving such data from an ERP system associated with a recipient, the system may track all the data of the resources used and/or requested by the particular recipient, all the resource transaction data (completed and uncompleted) of each resource transaction, fees of each resource transaction (completed and uncompleted), and/or the like, in order to track all the resource data for each recipient.

In some embodiments, the resource transaction data may be aligned to a master dataset previously generated and/or stored by the system. By way of non-limiting example, the system may store and/or regularly update a master dataset comprising a list of all the resources identified by the system and each of the suppliers/sources for each of the resources. Based on this master dataset, the system may match the resource transaction data received and/or identified with the resources and suppliers/sources of the master dataset to connect the data of the resource transaction data with the previously identified resources and suppliers/sources of the master dataset. Additionally, and in some embodiments, the system may—upon matching the data of the resource transaction data to the resources and suppliers/sources of the master dataset—match the data of the resource transaction data to standard identifiers associated with the matched resources and sources/suppliers. Such standard identifiers may comprise a unique string of alphanumeric characters to identify the resources and/or the sources/suppliers.

In some embodiments, the resource transaction dataset may comprise at least one of a plurality of resource transactions from a supplementary resource dataset, whereby such a supplementary resource dataset may comprise an item master dataset (e.g., a dataset that comprises information such as whether or not the resource expires, whether the resource is sterile, intended patient demographics, intended use, a manufacturing facility, information that is not time-dependent for the resource such as the intended use, whether the resource is internal or external use for a patient, and/or the like). In some embodiments, the supplementary resource dataset may comprise data pulled from the resource's product description page (e.g., which may be found online on a manufacturer's website, on the resource itself, and/or the like), data pulled from a resource's online presence (e.g., such as a manufacturer's social media pages which identify the resource and discusses the resource, a manufacturer's website or social media pages where the resource is dis- cussed by other users such as in reviews, and/or the like), and/or the like. In some embodiments, such supplementary resource data of the supplementary resource dataset may be datamined by the system (e.g., using the machine learning model/algorithm, large language model, and/or the like).

In some embodiments, the resource transaction data may be cleaned to remove outlier data, such as large order quantities of the resource(s) as compared to other instances of order quantities within the resource transaction data. In some embodiments, the cleaned data may further comprise the removal of data that may be considered irrelevant, such as data associated with orders of resource(s) that have been open for an extended period (e.g., greater than 90 days).

As shown in block 306, the process flow 300 may include the step of identifying at least one key performance indicator from the resource transaction dataset. In some embodiments, the system may identify at least one key performance indicator and/or a plurality of key performance indicators from a resource transaction dataset. Additionally, and as used herein, the key performance indicator refers to an indicator or marker indicating or predicting a resource supply shortage that may occur currently or in the future.

In some embodiments, these key performance indicators may comprise at least one of a general key performance indicator and/or a specific key performance indicator. Such a general key performance indicator may comprise at least one of an average daily usage of each resource, a volume of inventory on hand of each resource (e.g., on hand at different locations and/or at a particular location), a volume of order receipts of each resource, an average historical lead time of each resource (e.g., lead time between an order placement for the resource being received by supplier or source entity and time the resource was received by the recipient), an average days past due of each resource (e.g., average days past due since the resource was promised for delivery), a volume of open orders of each resource, a volume of past-due orders of each resource, a percentage of open purchase order (PO) lines that are past-due of each resource, a total of PO lines with cancellation activity of each resource, a volume of new orders of each resource, and/or the like. In some embodiments, the general key performance indicators may additionally and/or alternatively comprise at least one of total received amount of each resource (e.g., over a predetermined period and/or since the beginning of the resource's manufacture), count of total lines received, total open PO lines, count of total open PO lines, count of past due open PO lines, total PO lines authorized, total PO lines with cancellations, total extended cost authorized, total ordered quantity in low unit of measure, days of inventory on hand, percentage of open PO lines past due, and/or the like.

As will be understood by a person of skill in the art, any combination of the general key performance indicators (e.g., including a combination of only one general key perfor- mance indicator, a combination of two general key perfor- mance indicators, a combination of three general key per- formance indicators, to a combination of all the general key performance indicators) may be used by the system and within the processes described herein.

In some embodiments, the key performance indicators may comprise at least one specific key performance indica- tor. As used herein, the specific key performance indicator may refer to at least one key performance indicator which is uniquely used to predict certain resource supply shortages. In some embodiments, such an at least one specific key performance indicator may comprise a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitu- tions of each resource, a volume of resource substitutions of each resource, or a forward-looking estimated lead time of each resource, and/or the like.

As will be understood by a person of skill in the art, any combination of the specific key performance indicators (e.g., including a combination of only one specific key perfor- mance indicator, a combination of two specific key perfor- mance indicators, a combination of three specific key per- formance indicators, to a combination of all the specific key performance indicators) may be used by the system and within the processes described herein.

In some embodiments, the system may generate derived key performance indicators based on the general key per- formance indicators and/or the specific key performance indicators. For instance, the system may use statistical measures, such as the minimum, mean, maximum, standard deviation, z-score, and/or the like. In some embodiments, the derived key performance indicators may be generated or determined by the system over a set of predetermined periods, such as a previous twenty-six weeks, a previous year, a previous two years, and/or the like. In some embodi- ments, the system may determine the derived key perfor- mance indicators by determining a lag value of each of the general key performance indicators and/or each of the specific key performance indicators, where the lag value may comprise the general key performance indicator value(s) and/or specific key performance indicator value(s) over a previous period (e.g., one time period prior to the current period, two time periods prior to the current period, nine time periods prior to the current period, and/or the like). Further, the system may determine the derived key perfor- mance indicators by generating or determining the percent change of the general key performance indicator value(s) and the specific key performance indicator value(s) at the current time as compared to the lag values over the previous period(s). In some embodiments, the system may determine the derived key performance indicators may be determined based on the general key performance indicators and specific key performance indicators from a plurality of geolocations (e.g., nationwide) within the same predetermined period(s).

Additionally, and in some embodiments, the system may use a combination of at least one general key performance indicator and at least one specific key performance indicator for the key performance indicators and for generating the key performance signals, which is described in further detail below. However, and as understood by a person of skill in the art, the process described herein is not limited to requiring a specific key performance indicator or a general key performance indicator, but instead may base its analysis to predict future shortages for resources on any of the above key performance indicators and associated key performance signal(s).

As shown in block 308, the process flow 300 may include the step of generating—based on the at least one key performance indicator—at least one key performance signal, wherein the at least one key performance signal comprises a plurality of values of the at least one key performance indicator over a predetermined period. For example, such a key performance signal may be generated based on combining, organizing, arranging, and/or the like, a plurality of values associated with at least one key performance indicator over a predetermined period (such as in a table, vector, or graph format). For instance, and in some embodiments, the system may first determine at least one value associated with each key performance indicator identified from the resource transaction dataset. For instance, such a value of the key performance indicator may be based on the number of units for each resource ordered (e.g., resource transactions completed and/or uncompleted, or ordered but not fulfilled) and based on the total cost of each of the resource transactions (e.g., the total cost of each resource transaction, which may further comprise a plurality of resources ordered), where each value of each resource indicator may comprise the total value of each unit for each resource at each time within the predetermined period (each order within the predetermined period, from the beginning of the predetermined period to the end of the predetermined period). Thus, the system may track each value from each order placed for each resource, and for each key performance indicator (specific and/or general), to generate at least one key performance signal (e.g., specific key performance signal and/or general key performance signal, where applicable).

In some embodiments, the key performance signal may comprise a plurality of values for a key performance indicator associated with the resource associated with the resource identifier of the resource transaction dataset. In this manner, the key performance signal may comprise a signal (or line graph) of the various values for each key performance indicator of a resource over the predetermined period. In this manner, the system may track each value of each key performance indicator (which may further comprise specific and/or general, when applicable) for a resource as the values may change within the predetermined period. Such exemplary signals of the key performance indicators and signals are shown in FIGS. 6A-6D.

In some embodiments, the predetermined period may be predetermined by a client of the system (e.g., a particular recipient who would like to know a likelihood of a shortage for their associated resources), a manager of the system, and/or the like. For instance, the predetermined period may be used by the system to receive only subsets of the resource transaction data based on each predetermined period, rather than all the resource transaction data from the beginning of time of when the recipient began purchasing and/or requesting resources. In this manner, each resource transaction dataset may only comprise a subset of data regarding the resource transactions over the predetermined period. In some embodiments, the predetermined period may comprise at least one of a plurality of consecutive durations, a plurality of non-consecutive durations, and/or a combination of a plurality of consecutive durations and non-consecutive durations.

As used herein, the plurality of consecutive durations refers to a plurality of durations or periods of time, which are consecutive in time, such as but not limited to a previous week to a current week, a previous day to a current day, a plurality of prior weeks which are consecutive, a current year to day, a rolling window of time (e.g., the previous month, quarter, year, a prior month, a prior two months, a prior two consecutive quarters, a prior two consecutive years, and/or the like), and/or the like. In some embodiments, the predetermined period may comprise a previous day, a previous week, a previous two weeks, a previous three weeks, a previous four weeks, a previous five weeks, a previous six weeks, a previous six months, a previous year, a previous two years, and/or the like. Additionally and/or alternatively, as used herein, the plurality of non-consecutive durations refers to a plurality of periods in time that are non-consecutive to each other, which may comprise but are not limited to a first week of multiple months, the same week within a year for multiple years, the same month within a year for multiple years, the same quarter within a year for multiple years, two non-consecutive quarters within a year, and/or the like.

In some embodiments, the system may normalize the values of the key performance indicators to account for the values associated with a plurality of geolocations. In this manner, the values of the key performance indicators for the resource of resource transactions across a plurality of geolocations (such as nationwide values) may be normalized to account for different scales in the values generated for each geolocation (e.g., dividing the amount of inventory on hand by the average daily usage of inventory to obtain a "days of inventory on hand" figure that is comparable across different facilities and products). In some embodiments, the normalization of the key performance indicators may be done in an instance where the key performance indicators and/or signals are aggregated and comprise data and/or indicators across a set of resources or products within the same category or type, same manufacturer or source, and/or for the same resource over the same set of period(s).

As shown in block 310, the process flow 300 may include the step of applying the at least one key performance signal to a supply shortage labeling operation. For example, the system may apply the at least one key performance signal to a supply shortage labeling operation for the supply shortage labeling operation to process the key performance signal and determine and/or label instances or events within the key performance signal as predicting a future or current shortage prediction for the resource associated with the key performance signal. As used herein, the supply shortage labeling operation may comprise a labeling algorithm, which is designed and configured to identify patterns and/or instances within the key performance signal(s) that are predictive of a current and/or future-shortage event. In some embodiments, the supply shortage labeling operation may comprise a rule-based operation, which may be carried out through computer programming, and/or the like.

As shown in block 312, the process flow 300 may include the step of identifying—by the supply shortage labeling operation—at least one resource shortage event associated with the at least one resource identifier. In some embodiments, such a supply shortage labeling operation may generate outputs (i.e., identified resource shortage event(s)) which may be manually reviewed by an agent or employee of a client of the system, a manager of the system, and/or the like, to determine whether the output is correct or incorrect. In such embodiments, the manual review may comprise a feedback operation or feedback input by the manual reviewer that will adaptively program the supply shortage labeling operation to be continuously refined until the identification of these resource shortage event(s) are accurate. In some embodiments, the manual review may additionally and/or alternatively comprise a user input that comprises an adjustment to individual labels for each of these resource shortage event(s), whereby the individual labels may comprise different attributes and/or indicators for what is actually occurring at each event (e.g., identification of whether a shortage event is imminent, likely imminent, or only slightly possible in a future period).

In some embodiments, the supply shortage labeling operation comprises an algorithm that demarcates (e.g., labels) shortage events within the resource transaction dataset of the key performance indicators and signals, which may additionally be combined with at least one of a manual labeling augmentation and/or at least one reference to an external dataset or database that comprises currently identified shortages within an industry. Such an external dataset or database may be data mined and/or analyzed by the system and compared to the resource identifiers of the key performance signals that have identified resource shortage events to determine whether the resource identifier matches with a resource identifier within the external dataset. In some embodiments, the external dataset may comprise an industry-wide shortage list, such as the Federal Drug Administration's (FDA) Medical Device Shortages List, and used as an extra measure to confirm a likely future-shortage of the resource. Additionally, and in such an embodiment, by implementing the supply shortage labeling operation with the external dataset and/or the manual labeling, the system can ensure that only significant shortages and/or important resources are identified with a shortage event label.

As used herein, the manual labeling augmentation refers to a supplementary labeling of the shortage events that may have not been captured or identified by the supply shortage labeling operation. For example, and where the variation does not meet or exceed a variation threshold, but where a shortage event should still be labeled, a manual labeling may occur and used to train the supply shortage machine learning model to pick out similar future instances.

In some embodiments, this identification of the shortage event(s) may be based on an identification of a pattern (such as a pattern of the values of the key performance signal comprising a value below a particular threshold for consecutive periods), an identification of a particular value within the key performance signal (e.g., a value below an identified critical value of the key performance signal), and/or the like.

As shown in block 314, the process flow 300 may include the step of applying the at least one key performance signal and at least one resource shortage event to train a supply shortage machine learning model. For example, the system may apply the resource shortage event identified by the supply shortage operation for the resource to a supply shortage machine learning model, whereby such a supply shortage machine learning model may consider each key performance indicator(s) and key performance signal(s) preceding each shortage event to determine, based on an input of key performance indicator(s) and signal(s) for a specific resource, a likelihood the resource will go through a supply shortage at a future time (future period). As used herein, the application of the resource shortage event(s) to the supply shortage machine learning model comprises applying the shortage event(s) as an input to the supply shortage machine learning model and processing, by the supply shortage machine learning model, to train the supply shortage machine learning model.

In some embodiments, once the supply shortage machine learning model is trained, the system may use only the trained supply shortage machine learning model to identify the shortage events and predict whether a resource is about to undergo a future-shortage. Thus, and as used herein, the steps described with respect to blocks 310, 312, and 314, may be skipped and the key performance signal(s) may be applied on their own to the supply shortage machine learning model(s), and the supply shortage machine learning model(s) may identify the shortage event and generate a likelihood of a future-shortage on its own. Such a use of a machine learning model may lead to faster processing speeds, lowered computing resource consumption, greater efficiencies, and higher accuracies in predicting shortages for resources.

In some embodiments, the supply shortage machine learning model may be configured to determine a shortage score for the resource(s) of the resource identifier(s). In some embodiments, the shortage score may comprise a quantification and/or determination of the severity associated with the resource identifier's actual shortage over a specified period. In some embodiments, this severity may be a quantification, a value, and/or the like indicating how sever the shortage of the resource will be for the specified period. In some embodiments, the specified period may comprise a previous time, such as the previous week, previous two weeks, previous three weeks, previous four weeks, previous six weeks, previous twelve weeks, previous six months, previous fifty-two weeks, previous two years, and/or the like, and/or any combination thereof. Thus, and in some embodiments, the shortage score may be used by the system in determining previous shortages of the resource associated with the resource identifier, and which may then be used for comparison against future predictions (e.g., a likelihood of a future-shortage) for the resource (based on the resource identifier).

In some embodiments, the shortage score may be used to determine a previous and/or current shortage of a resource, such as where the system identifies that the shortage score is over a certain shortage threshold, the system may determine the resource was previously and/or currently in shortage. Similarly, and where the shortage score is less than a shortage threshold, the system may determine the resource is not in a shortage at a previous, current, or immediate future time. In some embodiments, the system may require a shortage score above the shortage threshold for a predetermined number of intervals before the system may determine the resource is in shortage or will be in shortage at a future time. For instance, and where the predetermined number is two out of three consecutive intervals, the system may determine the resource is in shortage when the shortage score meets or exceeds the shortage threshold for two out of three consecutive intervals, allowing only a "interior" gap (two intervals with a shortage score separated by a single interval without a shortage score).

Additionally, and in some embodiments, the system may determine—based on this shortage score—a shortage condition label. In some embodiments, the system may determine, at each specified period or each interval (of the specified period), a shortage condition label for each interval. Thus, and in some embodiments, the system may be used to identify the interval as comprising a shortage by generating the shortage condition label as "in shortage," "comprising a shortage," "shortage," and/or the like, such that the shortage condition label identifies the resource is in shortage during the interval. In some embodiments, the system may identify the resource—during the interval—does not comprise a shortage, and thus, the shortage condition label may comprise "not in shortage," "no shortage," and/or the like, such that the shortage condition label identifies the resource is not in shortage during the interval. In some embodiments, this shortage condition label may be used interchangeably with the shortage event label described above.

As shown in block 316, the process flow 300 may include the step of generating—by the supply shortage machine learning model—a likelihood of a future-shortage for the resource identifier, wherein the likelihood of a future-shortage for the resource identifier is based on the at least one key performance signal for at least one point in time. For example, the system may generate a likelihood (such as a value, an alert, a percentage, and/or the like) of the future-shortage based on the key performance signal(s), the values within the key performance signal(s), and the identified shortage events, and how this data is used by the supply shortage machine learning model to predict the resource's future shortages.

In some embodiments, the likelihood of future-shortage may comprise a shortage prediction over a future period, wherein the future period comprises at least one of a future one week (e.g., which may be consecutive to a current week or may be a week non-consecutive to a current week), a future two weeks (e.g., which may be consecutive to the current week or may be a week non-consecutive to the current week), a future three weeks (e.g., which may be consecutive to the current week or may be a week non-consecutive to the current week), a future four weeks (e.g., which may be consecutive to the current week or may be a week non-consecutive to the current week), a future five weeks (e.g., which may be consecutive to the current week or may be a week non-consecutive to the current week), a future six weeks (e.g., which may be consecutive to the current week or may be a week non-consecutive to the current week), a future seven weeks (e.g., which may be consecutive to the current week or may be a week non-consecutive to the current week), a future eight weeks (e.g., which may be consecutive to the current week or may be a week non-consecutive to the current week), a future nine weeks (e.g., which may be consecutive to the current week or may be a week non-consecutive to the current week), a future ten weeks (e.g., which may be consecutive to the current week or may be a week non-consecutive to the current week), a future eleven weeks (e.g., which may be consecutive to the current week or may be a week non-consecutive to the current week), a future twelve weeks (e.g., which may be consecutive to the current week or may be a week non-consecutive to the current week), and/or a plurality of consecutive future weeks (e.g., sub-periods within any of the ranges listed here and/or any of the ranges not listed explicitly herein, but which would be understood by a person of skill in the art).

In some embodiments, the system may generate a likelihood of a future-shortage for the resource identifier based on the data described herein that has been collected for the resource. For instance, the system may apply the at least one key performance signal to the shortage machine learning model, which may be trained to generate a probability of whether the resource associated with the at least one general key performance signal and the at least one specific key performance signal will have a future shortage. As used herein, the likelihood of the future-shortage may refer to a determined probability that the resource associated with the resource identifier will be in a shortage. Thus, the likelihood of the future-shortage may be used to indicate a predicted supply shortage at a future period.

In some embodiments, the supply shortage machine learning model may further consider the shortage score(s) for the resource over a specified period (or over previous intervals of the specified period), as well as at least one shortage condition label associated with the resource over the specified period. Thus, and in some embodiments, the likelihood of a future-shortage may indicate its own shortage condition label for a future period. Such a shortage condition label may comprise an indication of at least one of "in shortage,"

"not in shortage," and/or the like. In some embodiments, the system may determine the likelihood of a future-shortage is "in shortage" or "not in shortage" by comparing the likelihood of a future shortage against a shortage threshold, which may be used to determine the shortage condition label.

In some embodiments, and as shown in block 318, the process flow may include the step of determining a likelihood of a future-shortage for each resource identifier of a plurality of resource identifiers associated with a resource database. For example, and in some embodiments, the system may determine a likelihood of a future-shortage for each resource identifier from a resource identifier database, such that the system can keep a running (e.g., historical) and current determination of likelihoods for future-shortages in real-time, rather than only generating the likelihood of future-shortages when they are requested (e.g., by a user, by a client, by a manager of the system, and/or the like). In some such embodiments, the system may use the running (e.g., historical) determinations of the likelihood(s) of shortages as a reference point and/or as a comparison point for the system to understand (e.g., such as with the supply shortage machine learning model) how well the supply shortage machine learning model is performing in the real world (e.g., based on the actual shortages identified as compared to the shortages predicted by the system). In some such embodiments, and based on the performance of the supply shortage machine learning model, the system may adjust the supply shortage machine learning model to more accurately predict future-shortages.

FIG. 4 illustrates an exemplary process flow 400 for identifying shortage event(s), in accordance with an embodiment of the disclosure. In some embodiments, a system (e.g., similar to one or more of the systems described herein with respect to FIGS. 1A-1C and FIG. 2) may perform one or more of the steps of process flow 400.

In some embodiments, and as shown in block 402, the process flow 400 may include the step of identifying—by the supply shortage labeling operation—at least one variation of the at least one key performance signal. For example, the system may identify—using the supply shortage labeling operation—at least one variation of the at least one key performance signal, whereby such a variation comprises a deviation between the values of the key performance signal that are of such a great value (e.g., large deviations or differences from the mean or average of the key performance signal up to the current time that is being evaluated for deviations) between the overall values of the key performance signal across a set of preceding time periods, that the system may use to identify whether there is a potential problem or issue with the resource (such as a likely shortage). For instance, and where a value of the key performance signal shows that only a few orders of the resource are being completed or fulfilled at the time that is being evaluated for deviations (e.g., only 3 orders within a current week window), which is compared against the mean or average of greater value (e.g., a month before the average of the key performance signal showed that a mean of 10 orders within a week window would be fulfilled regularly), then the system may determine that a shortage event should be identified or flagged.

In some embodiments, and as shown in block 404, the process flow 400 may include the step of identifying—based on the at least one variation of the at least one key performance signal—the at least one resource shortage event. For example, and in some embodiments, once a variation is identified that is of such a great value (e.g., such as a value equaling or surpassing a variation threshold), then the system may label with a shortage event label the associated resource identifier which is associated with the key performance signal. Such a shortage event label, in some embodiments, may be a binary label which is attached to the resource identifier, such that a 1 value may indicate that a shortage event label has been generated or identified for the resource identifier, and a 0 value may indicate that a shortage event label is not present for the resource identifier. For each of these shortage event labels with a 1 value, the system may automatically transmit the resource identifier to the supply shortage machine learning model for training. Alternatively, in some embodiments, the supply shortage machine learning model may—itself—generate these binary values based on the labeling of the shortage events. Additionally, and in some such embodiments, the system may attach the time at which the shortage event label was identified (e.g., a time-stamp may be attached which indicates which week a shortage is likely to occur for the resource identifier, which would further comprise an attached shortage event label with a value of 1).

In some embodiments, the at least one resource shortage event is identified based on an identification of at least two variations within a rolling window of at least two time periods on the at least one key performance signal or based on at least one label augmentation identifier. For example, the system may identify or generate the resource shortage event for the key performance signal based on identifying the presence of two variations (e.g., those variations of such a great value from the mean or average, and/or those variations that meet or exceed the variation threshold) within consecutive periods (e.g., within multiple consecutive weeks, within consecutive ordering windows, within consecutive receipt windows, and/or the like) before labeling the key performance signal with the resource shortage event. In some embodiments, the at least two variations within the rolling window requirement may require three-consecutive periods of above-variation thresholds to occur before the shortage event is labeled. In such embodiments described herein (e.g., at least two variations within the rolling window), the system improves potential mislabeling based on noise within the key performance signal and thus, improves accuracy in labeling.

In additional and/or alternative embodiments, the supply shortage labeling operation may comprise a manual review and/or manual augmentation of the labeled resource shortage events. For example, and in some embodiments, a manual labeling operation may occur in lieu of and/or in combination with the process described herein with respect to process flow 400. In such embodiments, such a manual labeling and/or manual augmentation may occur in a similar manner as that described above with respect to FIG. 3 (e.g., a manual labeling based on external factors sch as an external database, and/or the like).

FIG. 5 illustrates an exemplary process flow 500 for generating a shortage alert interface component and configure a graphical user interface (GUI) of the user device based on the shortage alert interface component, in accordance with an embodiment of the disclosure. In some embodiments, a system (e.g., similar to one or more of the systems described herein with respect to FIGS. 1A-1C FIG. 2) may perform one or more of the steps of process flow 500.

In some embodiments, and as shown in block 502, the process flow 500 may include the step of identifying at least one shortage threshold associated with at least one user-identified resource identifier. For example, and in some embodiments, the system may identify a shortage threshold that is associated with a resource identifier that has been identified, selected, and/or input by a user of the system (e.g., such as a user associated with a client of the system, a user associated with a manager of the system, and/or the like), whereby the shortage threshold may be pre-determined, pre-stored, and/or the like, by the system. In this manner, the pre-selected, pre-identified, pre-determined, and/or the like, resource identifier that was identified by the user may indicate a resource that is important to the user's business (e.g., the client's/entity's business, such as day-to-day tasks, a small/large project, patient care, and/or the like). Thus, a user may input-such as via a graphical user interface of a user device connected (such as over a network) to the system the resources that are important to the user, important to a client, and/or the like-resource identifiers which should be watched closely for potential future shortages. In some embodiments, the shortage threshold may be stored in a database of the system, whereby the storage threshold may be individualized and specific to each resource identifier and/or may be standardized for each resource identifier. In some embodiments, and where the resource is identified as important to a user, such as through the process described herein, the shortage threshold may be adjusted (e.g., decreased) to identify more potential future-shortages. Such an adjustment may automatically occur by the system itself and based on the previously set shortage threshold for the resource identifier.

In some embodiments, and as shown in block 504, the process flow 500 may include the step of determining whether the likelihood of the future-shortage for the at least one user-identified resource identifier meets the at least one shortage threshold. Based on the resource identifiers of this user input, the system may determine the shortage threshold that should be relied on when determining whether the resource is about to undergo a future-shortage. In some embodiments, the shortage threshold may be used as a comparison against the likelihood of the future-shortage generated in block 316 of FIG. 3 (e.g., such as where the likelihood is a value, a probability value, a percentage, and/or the like). Thus, and in some embodiments, the likelihood of the future-shortage may be compared against the shortage threshold, and where the likelihood of the future-threshold meets or exceeds the shortage threshold, the system may generate an alert to a user device associated with the user. In some other embodiments, such a shortage threshold may be used as a comparison against the shortage score described above with respect to FIG. 3.

In some embodiments, and as shown in block 506, the process flow 500 may include the step of generating—in an instance where the likelihood of the future-shortage meets the at least one shortage threshold—a resource shortage alert interface component to configure a graphical user interface (GUI) of a user device. For example, and in some embodiments and based on the determination that the likelihood of the future-shortage does meet the shortage threshold, the system may generate a resource shortage alert interface component which may comprise the data regarding which resource (e.g., the resource associated with the resource identifier) will likely go through a supply shortage, at what time the supply shortage will likely occur (e.g., at what future period), the shortage score, the likelihood of the future-shortage, the average daily usage of the resource, the source resource number or identifier (e.g., the manufacturer's identifier for the resource), the source identifier (e.g., the manufacturer's name), and/or the like. In some embodiments, and where the system is further configured to consider potential substitution(s) of the resource, the system may additionally show likely substitution resources to present in the resource shortage alert interface component. Thus, the resource shortage alert interface component may be generated by the system and transmitted over a network (e.g., network 110) to a user device to configure the GUI of the user device, such as a user device associated with a recipient who has purchased and/or requested the resource in the past.

In some embodiments, the system may generate—in an instance where the likelihood of the future-shortage does not meet the shortage threshold—a resource availability interface component to configure the graphical user interface of the user device. In some embodiments, the system may generate, based on the likelihood of the future-shortage failing to meet or failing to exceed the shortage threshold, a resource availability interface component which may comprise the data regarding the resource associated with the resource identifier, the likelihood of the future-shortage showing the likelihood the resource will not go through a supply shortage at the future period, the average daily usage of the resource, the shortage score, the source resource number or identifier (e.g., the manufacturer's identifier for the resource), the source identifier (e.g., the manufacturer's name), and/or the like. Thus, the resource availability alert interface component may be generated by the system and transmitted over a network (e.g., network 110) to a user device to configure the GUI of the user device, such as a user device associated with a recipient who has purchased and/or requested the resource in the past.

In some embodiments, the shortage alert interface component and/or the resource availability interface component may further comprise data regarding a substitute resource which may include the same data of the resource of the resource identifier (e.g., the data regarding which substitute resource will likely go through a supply shortage), at what time the supply shortage will likely occur for the substitute resource (e.g., at what future period), the shortage score of the substitute resource, the average daily usage of the substitute resource, the source resource number or identifier (e.g., the manufacturer's identifier for the resource) of the substitute resource, the source identifier (e.g., the manufacturer's name) of the substitute resource, and/or the like). Thus, the system may additionally apply the processes described herein to a substitute resource of the resource for the resource identifier automatically when generating the likelihood of the future-shortage and determining whether the likelihood of the future-shortage score meets the shortage threshold to determine a likelihood of a supply shortage in the future.

Additionally, and/or alternatively, the system may generate the resource availability interface to show the data of various resources with their associated resource identifiers, whereby the resource availability interface may comprise data of each of the likelihoods of future-shortages for each of the resource identifiers (e.g., even those likelihoods of future-shortages that do not meet or exceed the shortage threshold). In some embodiments, the user may input (such as through mouse clicks, user device buttons, and/or the like) filters or selections to show only those resources, resource identifiers, and likelihoods of future shortages that meet the filters or selections in the resource availability interface. In some embodiments, the filters and/or selections may comprise a desired category, a supplier identifier, and/or the like, such as other such dimensions, which the user can use to filter the components of the resource availability interface they are shown. For instance, and by selecting a particular manufacturer, source, or supplier, the user could view a future-likelihood of shortages for those products manufactured and/or supplied by that particular entity. In some embodiments, the system may additionally generate an average (such as a straight or a weighted average) of a future-shortage likelihood for each selection or dimension (e.g., an average likelihood for all products manufactured by an entity, based on the above example). In this manner, the system and its interface(s) are interactive and may dynamically change in real-time as it receives real-time user inputs and filtering measures.

Thus, and based on the disclosure provided herein, the present disclosure provides a technical solution to a technical problem. Indeed, and as described herein, the technical problem includes the determination of future supply shortages based on electronic data. The technical solution presented herein allows for such an improvement to this technical problem by improving the processing speed of such processes described herein to make these determinations, especially for such robust and sizeable data as would be found for each of these resources. Further, the system is an improvement over existing solutions (i) with fewer steps to achieve the solution and fewer resources to consider, thus reducing the amount of computing resources, such as processing resources, storage resources, network resources, and/or the like, that are being used, (ii) providing a more accurate solution to the problem(s) (e.g., by providing earlier forewarning of future shortages for resources and products, which may have gone missed due to slight variations in data, which—in turn—allows for increased and improved mitigation responses by recipient entities of those resources or products and other such entities), thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources; (v) dynamically determining the shortage threshold and the likelihood of the future-shortage, and thus, for certain resources may improve the amount of resources used in determining a shortage prediction for each resource (where the greater the shortage threshold, the less the resources needing to be considered).

FIGS. 6A-6D illustrates exemplary graphs and signals of key performance indicators, in accordance with an embodiment of the disclosure. In some embodiments, a system (e.g., similar to one or more of the systems described herein with respect to FIGS. 1A-1C) may perform one or more of the steps to generate the exemplary graphs and signals of FIGS. 6A-6D.

Figure 6B:
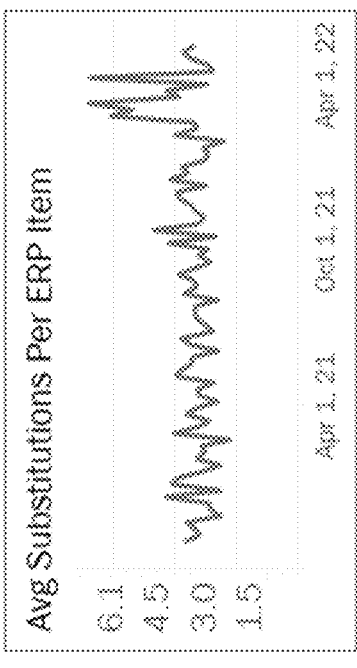
Figure 6D:
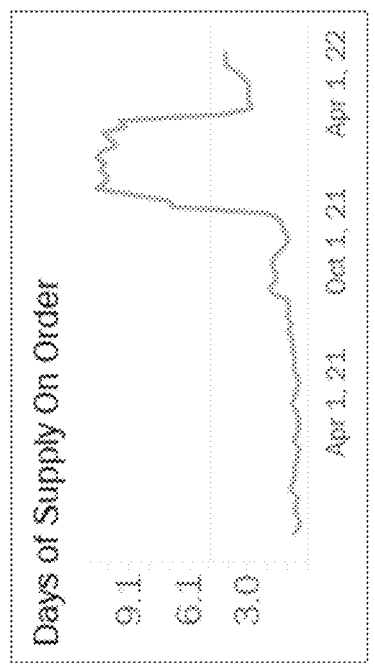
Figure 6A:
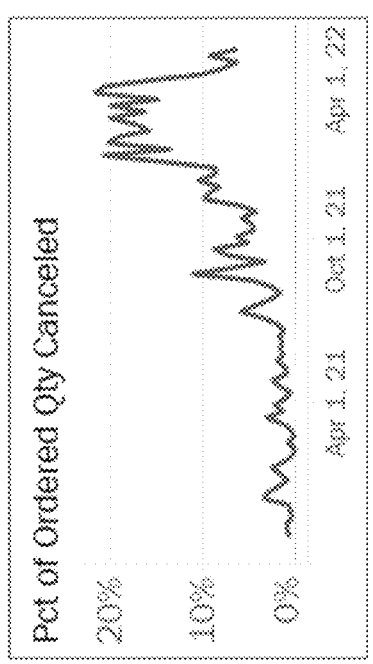
Figure 6C:
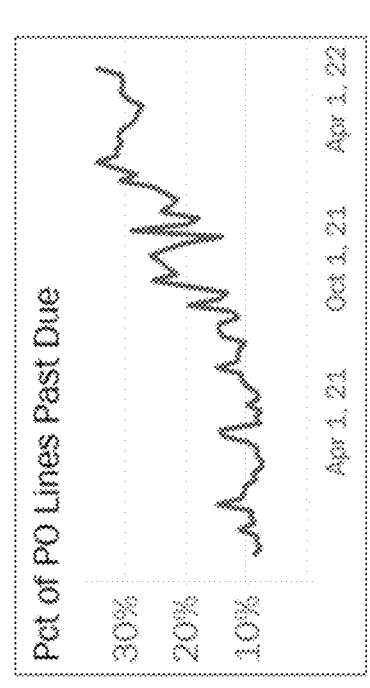

In particular, FIG. 6A illustrates a key performance signal (which may be general or specific) of a percent of ordered quantity cancelled for a particular resource over a predetermined period. Similarly, FIG. 6B illustrates a key performance signal (which may be general or specific) of an average substitutions per enterprise resource planning item (i.e., average substitutions tracked by the enterprise resource planning system for the resource) over a predetermined period. FIG. 6C illustrates a key performance signal (which may be general or specific) of a percentage of resource units (or products) ordered which are past due over a predetermined period. FIG. 6D illustrates a key performance signal (which may be general or specific) of days where the resource has been ordered, but not fulfilled over a predetermined period.

FIG. 7A illustrates an exemplary graph of a shortage score for a resource over a predetermined period and over a future period, in accordance with an embodiment of the disclosure. In some embodiments, a system (e.g., similar to one or more of the systems described herein with respect to FIGS. 1A-1C) may perform one or more of the steps to generate the exemplary graph of FIG. 7A. Thus, and in some embodiments, the shortage scores of a resource may be mapped over a plurality of weeks, such as previous weeks (i.e., predetermined period) and future weeks (i.e., a future period).

FIG. 7B illustrates an exemplary table of shortage scores based on source entities and over different time periods (e.g., predetermined period and/or future period), in accordance with an embodiment of the invention. In some embodiments, a system (e.g., similar to one or more of the systems described herein with respect to FIGS. 1A-1C) may perform one or more of the steps to generate the exemplary table of FIG. 7B. Thus, and in some embodiments, the shortage scores may comprise a percentage, an integer value, a decimal value, and/or the like. In some embodiments, the shortage score may be indicated as a standard deviation between values of the predetermined period.

FIG. 8 illustrates an exemplary table of key performance signals (which may be general or specific) over a predetermined period and a future period, in accordance with an embodiment of the disclosure. In some embodiments, a system (e.g., similar to one or more of the systems described herein with respect to FIGS. 1A-1C) may perform one or more of the steps to generate the exemplary table of FIG. 8. Thus, and in some embodiments, the key performance signals may be shown at a predetermined period (e.g., the signals to the left of line 801) and at a future period (e.g., the signals to the right of the line 801).

FIG. 9 illustrates an exemplary table of resource identifiers, sources for each resource, likelihood of a future-shortage for the resource identifier, associated substitute resources, and other such data, in accordance with an embodiment of the disclosure. In some embodiments, a system (e.g., similar to one or more of the systems described herein with respect to FIGS. 1A-1C) may perform one or more of the steps to generate the exemplary table of FIG. 9. In some embodiments, the table of FIG. 9 may further comprise data regarding each resource's average daily usage by recipients, substitute resources, substitute resource source entities, substitute resource identifiers (e.g., "sub product catalog num[bers]"), average daily usage of substitute resources, shortage scores of substitute resources, and/or the like. In some embodiments, the table of FIG. 9 may be generated as an interface component to configure a user device of a recipient user and/or a manager of the system.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable program-mable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-ori-ented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural program-ming languages, such as the "C" programming languages and/or similar programming languages. The computer pro-gram code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodi-ments, merely conceptual delineations between systems and one or more of the systems illustrated by a block in the block diagrams may be combined or share hardware and/or soft-ware with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a tran-sitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s). The computer program product comprises a non-transitory computer-readable storage medium having computer-executable instructions.

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a method for using a machine learning algorithm and a natural language processing to categorize service suppliers have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims, therefore, include not only the combination of elements which are literally set forth but all equivalent structure, material or acts for performing substantially the same function in substantially the same way to obtain substantially the same result. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub combination or variation of a sub combination.

What is claimed is:

1. A system for predicting resource shortages using machine learning, wherein the system is structured for dynamic medical product shortage preclusion and remediation based on determining a future supply shortage for one or more resource identifiers for healthcare products, the system comprising:

a memory device with computer-readable program code stored thereon;

at least one processing device operatively coupled to the at least one memory device and the at least one communication device, wherein executing the computer-readable code is configured to cause the at least one processing device to:

identify at least one resource identifier from a resource database as a candidate for shortage prediction, wherein the at least one resource identifier corresponds to a healthcare product resource comprising at least one of a physical item, a product, a device, or an item of manufacture;

receive a resource transaction dataset associated with the at least one resource identifier, wherein the resource transaction dataset comprises resource transaction data parameters associated with the resource comprising at least a source or manufacturer of the resource, a critical level of resource, and substitutions for the resource;

identify at least one key performance indicator from the resource transaction data parameters of the resource transaction dataset that is associated with predicting a resource supply shortage of a resource;

generate, based on the at least one key performance indicator, at least one key performance signal, wherein the at least one key performance signal comprises a plurality of values of the at least one key performance indicator over a predetermined period;

apply the at least one key performance signal to a supply shortage labeling operation, comprising identifying patterns within the at least one key performance signal that are associated with the resource supply shortage of the resource;

identify, by the supply shortage labeling operation, at least one resource shortage event associated with the at least one resource identifier;

apply the at least one key performance signal and the at least one resource shortage event to train a supply shortage machine learning model; and generate, by the supply shortage machine learning model, a likelihood of a future-shortage for the resource identifier, wherein the likelihood of a future-shortage for the resource identifier is based on the at least one key performance signal for at least one point in time.

2. The system of claim 1, wherein the at least one processing device is further configured to:

identify, by the supply shortage labeling operation, at least one variation of the at least one key performance signal;

combine the at least one at least one key performance signal with data extracted from an external industry medical devices shortage list data set; and identify, based on the at least one variation of the at least one key performance signal, the at least one resource shortage event, such that the resource shortage event only corresponds to the resource supply shortage of the resource that is above a predetermined significance threshold determined based on at least the data extracted from the external industry medical devices shortage list data set.

3. The system of claim 2, wherein the at least one resource shortage event is identified based on an identification of at least two variations within a rolling window of at least two time periods on the at least one key performance signal or based on at least one label augmentation identifier, wherein the at least one key performance signal is generated based on the at least one key performance indicator value associated with a number of units ordered, and total cost of associated with the corresponding resource transaction.

4. The system of claim 1, wherein data in the resource transaction dataset for the at least one resource identifier is aggregated across a plurality of sources or manufacturers of the resource, wherein at least one processing device is further configured to determine a likelihood of future-shortage for each resource identifier of a plurality of resource identifiers associated with a resource database.

5. The system of claim 1, wherein the at least one processing device is further configured to:

identify at least one shortage threshold associated with at least one user-identified resource identifier;

determine whether the likelihood of the future-shortage for the at least one user-identifier resource identifier meets the at least one shortage threshold; and generate, in an instance where the likelihood of the future-shortage meets the at least one shortage threshold, a resource shortage alert interface component to configure a graphical user interface of a user device.

6. The system of claim 1, wherein the resource transaction dataset associated with the at least one resource identifier comprises at least one of a plurality of resource transactions from a plurality of resource recipients and across a plurality of separate geolocations, or a supplementary resource dataset, wherein the wherein the at least one processing device is further configured to:

normalize a value of the at least one key performance indicator for each of the plurality of resource transactions, based on (i) a geolocation associated with the at least one key performance indicator, and (ii) variation in scales of the values generated for each geolocation; and wherein the normalizing of the at least one key performance indicator is performed in response to determining that the at least one key performance indicator is aggregated and comprises data across a set of products within a same category, a same manufacturer, and/or same resource over a same set of time period.

7. The system of claim 1, wherein receiving the resource transaction dataset further comprises constructing a supplementary resource dataset, wherein the supplementary resource dataset comprises data associated with sterility, intended patient, and/or intended use of the resource, wherein constructing the supplementary resource dataset comprises:

extracting resource data from a product description page associated with a manufacturer of the resource.

8. The system of claim 1, wherein the at least one key performance indicator comprises a combination of at least one of at least one general key performance indicator and at least one specific key performance indicator, wherein the at least one specific key performance indicator is associated with predicting predetermined supply shortages, wherein the at least one specific key performance indicator comprises at least one of an average daily usage of each resource, a volume of inventory on hand of each resource, a volume of order receipts of each resource, an average historical lead time of each resource, an average days past due of each resource, a volume of open orders of each resource, a volume of past-due orders of each resource, a percentage of open purchase order (PO) lines that are past-due of each resource, a total of PO lines with cancellation activity of each resource, a volume of new orders of each resource, a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitutions of each resource, a volume of resource substitutions of each resource, or a forward-looking estimated lead time of each resource.

9. The system of claim 1, wherein the resource transaction dataset is based on at least one resource recipient system, wherein receiving the resource transaction dataset further comprises:

matching the resource transaction dataset to a plurality of resources;

matching the resource transaction dataset to one or more standard identifiers comprising a unique string of alphanumeric characters; and updating a master dataset comprising a list of identified resources.

10. The system of claim 1, wherein the predetermined period comprises at least one of a plurality of consecutive durations or a plurality of non-consecutive durations, wherein receiving the resource transaction dataset further comprises:

cleaning the resource transaction dataset to remove outlier data, comprising reporting data with order quantity discrepancies, and irrelevant data associated with a time beyond a predetermined threshold.

11. The system of claim 1, wherein the likelihood of future-shortage comprises a shortage prediction over a future period, and wherein the future period comprises at least one of a future one week, a future two weeks, a future three weeks, a future four weeks, a future five weeks, a future six weeks, a future seven weeks, a future eight weeks, a future nine weeks, a future ten weeks, a future eleven weeks, a future twelve weeks, or a plurality of consecutive future weeks.

12. A computer program product for predicting resource shortages using machine learning, wherein the computer program product is structured for dynamic medical product shortage preclusion and remediation based on determining a future supply shortage for one or more resource identifiers for healthcare products, wherein the computer program product comprises non-transitory computer-readable program code portions embodied therein, the non-transitory computer-readable program code portions which when executed by a processing device are configured to cause the processor to:

identify at least one resource identifier from a resource database as a candidate for shortage prediction, wherein the at least one resource identifier corresponds to a healthcare product resource comprising at least one of a physical item, a product, a device, or an item of manufacture;

receive a resource transaction dataset associated with the at least one resource identifier, wherein the resource transaction dataset comprises resource transaction data parameters associated with the resource comprising at least a source or manufacturer of the resource, a critical level of resource, and substitutions for the resource;

identify at least one key performance indicator from the resource transaction data parameters of the resource transaction dataset that is associated with predicting a resource supply shortage of a resource;

generate, based on the at least one key performance indicator, at least one key performance signal, wherein the at least one key performance signal comprises a plurality of values of the at least one key performance indicator over a predetermined period;

apply the at least one key performance signal to a supply shortage labeling operation, comprising identifying patterns within the at least one key performance signal that are associated with the resource supply shortage of the resource;

identify, by the supply shortage labeling operation, at least one resource shortage event associated with the at least one resource identifier;

apply the at least one key performance signal and the at least one resource shortage event to train a supply shortage machine learning model; and generate, by the supply shortage machine learning model, a likelihood of a future-shortage for the resource identifier, wherein the likelihood of a future-shortage for the resource identifier is based on the at least one key performance signal for at least one point in time.

13. The computer program product of claim 12, wherein data in the resource transaction dataset for the at least one resource identifier is aggregated across a plurality of sources or manufacturers of the resource, wherein the non-transitory computer-readable program code portions are further configured to cause the processor to determine a likelihood of future-shortage for each resource identifier of a plurality of resource identifiers associated with a resource database.

14. The computer program product of claim 12, wherein the resource transaction dataset associated with the at least one resource identifier comprises at least one of a plurality of resource transactions from a plurality of resource recipients and across a plurality of geolocations, or a supplementary resource dataset, the non-transitory computer-readable program code portions are further configured to cause the processor to:

normalize a value of the at least one key performance indicator for each of the plurality of resource transactions, based on (i) a geolocation associated with the at least one key performance indicator, and (ii) variation in scales of the values generated for each geolocation; and wherein the normalizing of the at least one key performance indicator is performed in response to determining that the at least one key performance indicator is aggregated and comprises data across a set of products within a same category, a same manufacturer, and/or same resource over a same set of time period.

15. The computer program product of claim 12, wherein the at least one key performance indicator comprises a combination of at least one of at least one general key performance indicator and at least one specific key performance indicator, wherein the at least one specific key performance indicator is associated with predicting predetermined supply shortages, wherein the at least one specific key performance indicator comprises at least one of an average daily usage of each resource, a volume of inventory on hand of each resource, a volume of order receipts of each resource, an average historical lead time of each resource, an average days past due of each resource, a volume of open orders of each resource, a volume of past-due orders of each resource, a percentage of open purchase order (PO) lines that are past-due of each resource, a total of PO lines with cancellation activity of each resource, a volume of new orders of each resource, a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitutions of each resource, a volume of resource substitutions of each resource, or a forward-looking estimated lead time of each resource.

16. The computer program product of claim 12, wherein the predetermined period comprises at least one of a plurality of consecutive durations or a plurality of non-consecutive durations, wherein receiving the resource transaction dataset further comprises:

cleaning the resource transaction dataset to remove outlier data, comprising reporting data with order quantity discrepancies, and irrelevant data associated with a time beyond a predetermined threshold.

17. A computer implemented method for predicting resource shortages using machine learning, wherein the computer implemented method is structured for dynamic medical product shortage preclusion and remediation based on determining a future supply shortage for one or more resource identifiers for healthcare products, the computer implemented method comprising:

identifying at least one resource identifier from a resource database as a candidate for shortage prediction, wherein the at least one resource identifier corresponds to a healthcare product resource comprising at least one of a physical item, a product, a device, or an item of manufacture;

receiving a resource transaction dataset associated with the at least one resource identifier, wherein the resource transaction dataset comprises resource transaction data parameters associated with the resource comprising at least a source or manufacturer of the resource, a critical level of resource, and substitutions for the resource;

identifying at least one key performance indicator from the resource transaction data parameters of the resource transaction dataset that is associated with predicting a resource supply shortage of a resource;

generating, based on the at least one key performance indicator, at least one key performance signal, wherein the at least one key performance signal comprises a plurality of values of the at least one key performance indicator over a predetermined period;

applying the at least one key performance signal to a supply shortage labeling operation, comprising identifying patterns within the at least one key performance signal that are associated with the resource supply shortage of the resource;

identifying, by the supply shortage labeling operation, at least one resource shortage event associated with the at least one resource identifier;

applying the at least one key performance signal and the at least one resource shortage event to train a supply shortage machine learning model; and generating, by the supply shortage machine learning model, a likelihood of a future-shortage for the resource identifier, wherein the likelihood of a future-shortage for the resource identifier is based on the at least one key performance signal for at least one point in time.

18. The computer implemented method of claim 17, wherein data in the resource transaction dataset for the at least one resource identifier is aggregated across a plurality of sources or manufacturers of the resource, wherein the computer implemented method further comprising determining a likelihood of future-shortage for each resource identifier of a plurality of resource identifiers associated with a resource database.

19. The computer implemented method of claim 17, wherein the at least one key performance indicator comprises a combination of at least one of at least one general key performance indicator and at least one specific key performance indicator, wherein the at least one specific key performance indicator is associated with predicting predetermined supply shortages, wherein the at least one specific key performance indicator comprises at least one of an average daily usage of each resource, a volume of inventory on hand of each resource, a volume of order receipts of each resource, an average historical lead time of each resource, an average days past due of each resource, a volume of open orders of each resource, a volume of past-due orders of each resource, a percentage of open purchase order (PO) lines that are past-due of each resource, a total of PO lines with cancellation activity of each resource, a volume of new orders of each resource, a volume of purchase order (PO) lines with at least one discrepancy of each resource, an average number of days orders are open of each resource, a weighted calculation of unexpected delays in order receipt of each resource, a volume of PO lines that are on backorder of each resource, a volume of cancelled orders of each resource, a volume of resource-provider substitutions of each resource, a volume of resource substitutions of each resource, or a forward-looking estimated lead time of each resource.

20. The computer implemented method of claim 17, wherein the predetermined period comprises at least one of a plurality of consecutive durations or a plurality of non-consecutive durations, wherein receiving the resource transaction dataset further comprises:

cleaning the resource transaction dataset to remove outlier data, comprising reporting data with order quantity discrepancies, and irrelevant data associated with a time beyond a predetermined threshold.

\* \* \* \* \*